United States Patent [19]

Zahn et al.

[11] Patent Number: 4,647,187

[45] Date of Patent: Mar. 3, 1987

[54] PHOTOGRAPHIC COPIER

[75] Inventors: Wolfgang Zahn, Munich; Günter Findeis, Sauerlach; Ernst Biedermann, Taufkirchen, all of Fed. Rep. of Germany

[73] Assignee: AGFA-Gevaert Aktiengesellschaft, Leverkusen, Fed. Rep. of Germany

[21] Appl. No.: 778,607

[22] Filed: Sep. 20, 1985

[30] Foreign Application Priority Data

Oct. 9, 1984 [DE] Fed. Rep. of Germany ....... 3437047

[51] Int. Cl.[4] .............................................. G03B 27/52
[52] U.S. Cl. ......................................... 355/21; 355/55
[58] Field of Search ....................... 355/21, 18, 27–29, 355/39, 44, 45, 63, 64, 55, 56

[56] References Cited

U.S. PATENT DOCUMENTS

| 4,184,763 | 1/1980 | Handsman et al. | 355/27 |
| 4,220,410 | 9/1980 | Bloodgood | 355/18 |
| 4,310,231 | 1/1982 | Konishi et al. | 355/21 X |

Primary Examiner—Richard A. Wintercorn
Attorney, Agent, or Firm—Peter K. Kontler

[57] ABSTRACT

A photographic copier has a first platform for supporting an original to be copied, and a second platform for supporting copy paper. A focusing system is disposed between the platforms and includes a plate which can be mounted at different distances from the platforms. The plate has a central opening which removably receives a tubular holder. The holder is supported in the opening by a ring which permits the position of the holder relative to the plate to be adjusted. Two lenses are removably mounted in the holder and serve to project an image of the original onto the copy paper. Different magnifications can be achieved in that the copier comes equipped with a variety of holders having different lengths, and a few selected lenses having different optical characteristics. The magnification is changed by simply interchanging holders and/or lenses, and adjusting the position of a holder to be used relative to the plate.

18 Claims, 2 Drawing Figures

PHOTOGRAPHIC COPIER

BACKGROUND OF THE INVENTION

The invention relates generally to a copier.

More particularly, the invention relates to a photographic copier, especially a so-called roll copier in which the originals to be copied and the copy paper are supplied from respective rolls.

A known photographic copier has a first support defining a first support plane in which the originals are disposed during copying. A second support defines a second support plane in which the copy paper is located for copying. The first and second supports are spaced from one another by a fixed distance, and an objective of variable focal length is situated between the supports. The objective is designed such that a sharp image of an original in the first plane may be formed in the second plane at a variety of magnifications.

Mounting of the original and copy paper supports at a fixed distance from one another has significant advantages for transport of the originals and the copy paper. This is especially true in roll copiers. However, it is frequently necessary for copiers to be capable of achieving a large number of magnifications in order to permit originals of different size to be reproduced on copy paper having a variety of sizes. In so-called universal printers, the number of magnifications required just to make borderless copies may be of the order of one hundred.

It is known to achieve a variety of magnifications using an adjustable objective. According to the teachings of the West German Offenlegungsschrift No. P 33 39 960, such an objective may include two lenses which, without affecting image sharpness, produce different magnifications depending upon their positions along the optical axis. However, adjustment of the magnification requires very precise positioning of the lenses. Moreover, positioning of the lenses is complicated by the fact that this must be accomplished differently for the two lenses due to tolerances in the lens-to-image distances of the individual lenses. The controls required for adjustment of the magnification are thus very expensive.

OBJECTS AND SUMMARY OF THE INVENTION

It is an object of the invention to provide an arrangement which enables a large number of magnifications to be achieved at relatively low cost.

Another object of the invention is to provide an arrangement which makes it possible to produce a large number of magnifications with a relatively small number of optical components.

The preceding objects, as well as others which will become apparent as the description proceeds, are achieved by the invention.

The invention resides in a copier, particularly a photographic copier, which comprises the following:

A. A first support defining a first support plane for originals, e.g., film negatives, to be copied.

B. A second support defining a second support plane for copying material, e.g., copy paper. Preferably, the first and second supports are fixed at a predetermined distance from one another.

C. A focusing system of variable focal length between the supports. The focusing system is designed to form sharp images of originals in the first plane on copying material in the second plane at different magnifications. The focusing system includes a carrier, e.g., a plate, and an objective unit. This unit comprises a tubular holder removably mounted in the carrier, and at least one lens which is removably mounted in the holder.

The objective unit may comprise another lens, and such lens may also be removably mounted in the holder.

The copier may be a roll copier, that is, a copier of the type in which the originals and the copying material are supplied from respective rolls. To this end, the copier may be provided with first means for conveying successive originals of a roll of originals by the first support, and second means for conveying successive increments of an unexposed roll of copying material by the second support.

In accordance with the invention, the focusing system includes a pair of lenses, a lens holder for spacing the lenses from one another, and a carrier for the holder. At least one of the lenses is removably mounted in the holder thereby creating the possibility of positioning the lenses at different distances from one another. Furthermore, the holder is removably mounted in the carrier which makes it possible to adjust the holder relative to the carrier or to interchange the holder.

According to one embodiment of the invention, a different holder is provided for each magnification. In order to change the magnification, it is merely necessary to remove the original holder; select the appropriate holder for the new magnification; insert one or more lenses in the new holder; and mount the holder-lens assembly in proper position in the copier. The relative position of the lenses is established by the length and/or position of the holder. The carrier may here be employed for all magnifications while a given pair of lenses may be used for a whole series of magnifications. Only a new holder is required for each magnification.

According to another embodiment of the invention, the same holder may be used for several magnifications. A change in magnification may then be achieved simply by adjusting the position of the holder and interchanging one or both lenses. The carrier may here again be employed for all magnifications, and each lens, as well as each tube, may be used for several magnifications.

The novel features which are considered as characteristic of the invention are set forth in particular in the appended claims. The improved copier itself, however, both as to its construction and its mode of operation, together with additional features and advantages thereof, will be best understood upon perusal of the following detailed description of certain specific embodiments with reference to the accompanying drawings.

DESCRIPTION OF THE PREFERRED EMBODIMENTS

Figure 1:
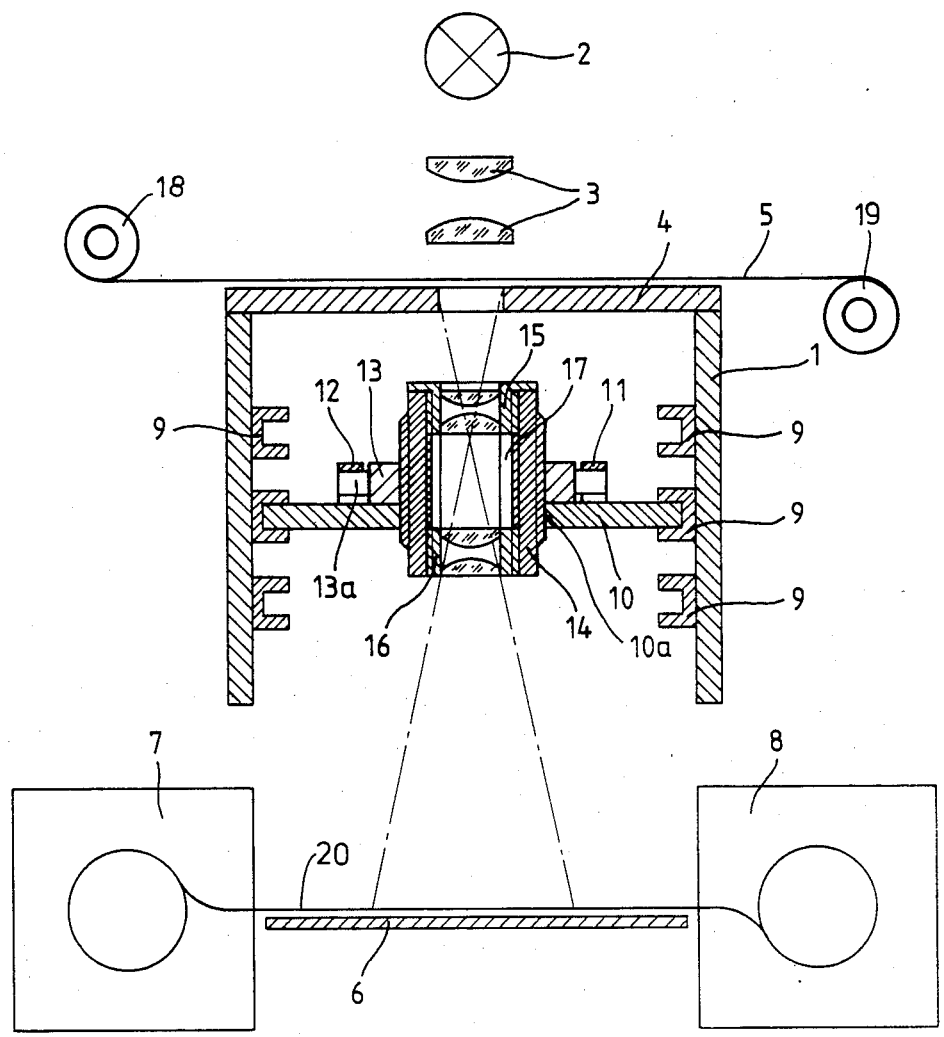
FIG. 1 is a schematic longitudinal sectional view of a photographic roll copier in accordance with the invention.

FIG. 1 illustrates a copier according to the invention. This copier is assumed to be a photographic copier and is shown as being in the form of a roll copier, that is, a copier in which the originals and the copying material are supplied from respective rolls.

The copier has a frame 1 which carries a first support or platform 4. The upper surface of the platform 4 defines a first support plane for a strip 5, e.g., a film strip, having a series of originals, e.g., negatives, to be copied. The strip 5 is supplied from a roll carried by a supply reel 18 and, after passing by the platform 4, is rewound onto a take-up reel 19. The reels 18,19 constitute, or constitute part of, a means for conveying successive originals of the strip 5 along the platform 4. The strip 5 may be advanced from the reel 18 to the reel 19 either manually or by means of a motor. The platform 4 has a central opening, and an original which is to be copied is brought into register with this opening. Illumination of the original for copying is effected by a light source 2 and a condenser 3.

A second support or platform 6 is disposed below the platform 4. The upper surface of the platform 6 defines a second support plane for a band 20 of photographic copying material, e.g., copy paper. The band 20 is unwound from a roll of unexposed copying material carried by a supply cassette 7 and, after passing by the platform 6, is rewound onto a take-up cassette 8. The cassettes 7,8 constitute, or constitute part of, a means for conveying successive increments of the unexposed band 20 by the platform 6. The band 20 is advanced from the cassette 7 to the cassette 8 employing conventional guide means and drives.

In order to make a copy of an original which is aligned with the opening in the platform 4, an unexposed increment of the band 20 is brought into register with the platform 6. The original is illuminated via the light source 2 and condenser 3 so that an image of the original is projected towards the platform 6. The image is focused onto the unexposed increment of the band 20 which overlies the platform 6 by means of a focusing system located between the platforms 4 and 6.

Figure 2:
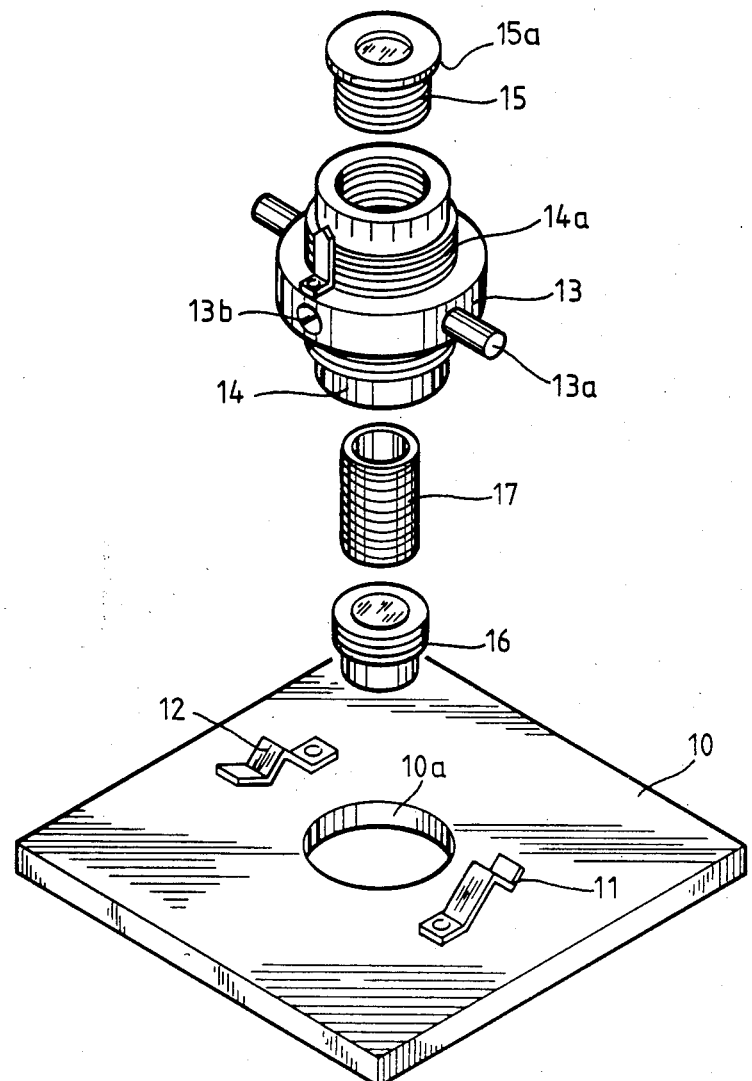
FIG. 2 is an exploded perspective view of the focusing system of the copier.

Referring now to FIG. 2 in conjunction with FIG. 1, the focusing system includes a carrier in the form of a plate 10 having an opening 10a. As seen in FIG. 1, the frame 1 of the copier has a pair of generally vertical side walls which are approximately parallel to the path of the light rays travelling from the light source 2 to the platform 6. A series of U-shaped guide rails 9 is mounted on each of the side walls with the guide rails 9 on each side wall being disposed at different levels. Each of the guide rails 9 on one side wall cooperates with a guide rail 9 on the other side wall to define a guide capable of slidably receiving the carrier plate 10.

The focusing system further includes a tubular holder 14 which is dimensioned so as to be insertable in the opening 10a of the carrier plate 10. A ring 13 circumscribes the holder 14 and serves to mount the latter on the carrier plate 10. The ring 13 has a pair of diametrically opposed, radially extending pins 13a which rest on the upper surface of the carrier plate 10 when the ring 13 supports the holder 14 on the carrier plate 10. The upper surface of the carrier plate 10 is provided with a pair of bent leaf springs 11 and 12 which are arranged so that each can confine one of the pins 13a.

In mounting the holder 14 on the carrier plate 10, the holder 14 is inserted into the opening 10a from above and lowered until the pins 13a of the ring 13 contact the upper surface of the carrier plate 10. The ring 13 is then manipulated to slide each of the pins 13a beneath a respective spring 11,12. The springs 11,12 maintain the holder-ring assembly in a predetermined position on the carrier plate 10 and constitute a connecting means for releasably connecting the ring 13, and hence the holder 14, with the carrier plate 10.

The holder 14 has an external thread 14a which meshes with an internal thread of the ring 13. This enables the axial position of the holder 14 relative to the ring 13 and, accordingly, the axial position of the holder 14 relative to the carrier plate 10 to be varied by rotating the ring 13 and the holder 14 relative to one another. The ring 13 and holder 14 may be locked to one another in any relative position by one or more locking elements in the form of a screw or screws 13b extending through the ring 13 radially of the latter and the holder 14. In addition to its function of mounting the holder 14 on the carrier plate 10, the ring 13 serves as an adjusting device for fixing the holder 14 in different axial positions on the carrier plate 10.

The holder 14 is further provided with an internal thread. A lens 15 having a mating external thread is screwed into the upper end of the holder 14 while a second lens 16 also having an external thread designed to mesh with the internal thread of the holder 14 is screwed into the lower end of the latter. The positions of the lenses 15,16 in the holder 14 may be determined by rims formed on the lenses 15,16. This is illustrated in FIG. 2 by a rim 15a on the lens 15. Such rims serve as stops which, upon abutting the adjacent end faces of the holder 14, prevent further movement of the respective lenses 15,16. It is also possible to establish the positions of the lenses 15,16 in the holder 14 using a spacer in the form of a sleeve 17 which is disposed inside the holder 14 between the lenses 15,16. The sleeve 17 may have an external thread designed to mesh with the internal thread of the holder 14, and the sleeve 17 is then screwed into the holder 14.

The lenses 15,16 may be designed in such a manner that each lens 15,16 constitutes one lens of a variable objective, i.e., an objective of variable focal length, having two lenses. Each of the lenses 15,16 is then a partial objective which, in cooperation with the other lens 16,15, defines a complete objective of variable focal length.

Another possibility is to construct the upper lens 15 as a complete objective. The lower lens 16 here constitutes an auxiliary lens which may be selectively combined with the upper lens 15.

The copier of the invention comes with a variety of holders 14 and a few selected lenses 15,16, and different magnifications are achieved by using various combinations of holders 14 and lenses 15,16. The various holders 14 may differ from one another in having different lengths. However, as the lower lens 16 is stopped upon abutting the lower end face of the sleeve 17, holders 14 of the same length may be used for different magnifications by adjusting the positions of the ring 13 and the sleeve 17.

According to one embodiment of the invention, a different holder 14 is provided for each magnification. In order to change the magnification, the holder 14 and lenses 15,16 previously in the copier are removed. The appropriate holder 14 for the new magnification is selected, as are the appropriate lenses 15,16 which are then inserted in the new holder 14 in the proper positions either by bringing them into abutment with a spacer such as the sleeve 17 or, if the lenses 15,16 are provided with rims such as the rim 15a, by causing the rims to abut the corresponding end faces of the holder 14. If the lenses 15,16 are designed such that a lens 15 constitutes a complete objective while a lens 16 constitutes an auxiliary lens, it may only be necessary to insert a lens 15 in the new holder 14. Once a lens 15 or a pair of lenses 15,16 has been properly installed in the new holder 14, the latter is mounted on the carrier plate 10 via the ring 13. Prior to mounting of the holder 14 on the carrier plate 10, the ring 13 is axially adjusted on the holder 14 in such a manner that, upon insertion of the holder 14 in the carrier plate 10 and sliding of the latter into the proper pair of guide rails 9, the holder 14 is correctly positioned in the copier. The ring 13 and holder 14 are locked to one another by means of the screw or screws 13b once the ring 13 has been adjusted.

According to another embodiment of the invention, the same holder 14 may be used for several magnifications. The procedure for changing the magnification is here the same as that just described except that it may not be necessary to select a new holder 14.

The same carrier plate 10 may be used for all magnifications in either embodiment of the invention.

In accordance with the invention, the carrier plate 10 functions to determine the position of the focusing system in the copier; the holders 14 function to determine the positions of the lenses 15,16 relative to the carrier plate 10; and the lenses 15,16 function to actually project an image of an original onto the band 20 of copying material. Such a division of functions enables virtually any desired magnification to be achieved by employing a few selected lenses 15,16 in conjunction with a suitable variety of holders 14. Since the holders 14 can be manufactured at relatively low cost, this large number of magnifications is obtainable with relatively little expense.

Without further analysis, the foregoing will so fully reveal the gist of the present invention that others can, by applying current knowledge, readily adapt it for various applications without omitting features which, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A copier, particularly a photographic copier, comprising a first support defining a first support plane for originals to be copied; a second support defining a second support plane for copying material; and a focusing system of variable focal length between said supports, said focusing system being designed to form sharp images of originals in said first plane on copying material in said second plane at different magnifications, and said focusing system including a carrier, and an objective unit, said unit comprising a tubular holder removably mounted on said carrier, and at least one lens removably mounted in said holder, and said focusing system also including an adjusting device for fixing said holder in different positions on said carrier to thereby achieve different magnifications, said adjusting device comprising a ring which surrounds said holder, and said ring and said holder being relatively adjustable axially of said holder, said adjusting device further comprising a locking element for locking said ring and said holder to one another.

2. The copier of claim 1, comprising first means for conveying successive originals of a roll of originals by said first support, and second means for conveying successive increments of an unexposed roll of copying material by said second support.

3. The copier of claim 1, wherein said supports are fixed at a predetermined distance from one another.

4. The copier of claim 1, wherein said carrier is in the form of a plate.

5. The copier of claim 1, wherein said unit comprises another lens.

6. The copier of claim 5, wherein each of said lenses is removably mounted in said holder.

7. The copier of claim 5, wherein one of said lenses constitutes an objective, and the other of said lenses constitutes an interchangeable auxiliary lens.

8. The copier of claim 5, said lenses together constituting an objective of variable focal length; and further comprising additional tubular holders designed to be removably mounted on said carrier and to removably receive said lenses, said holders supporting adjustable abutment means for said lenses to permit the latter to assume different positions so that each of said holders is capable of providing different magnifications when said lenses are mounted therein.

9. The copier of claim 1, comprising a plurality of guides between and at different distances from said supports, each of said guides being designed to removably receive said carrier.

10. The copier of claim 1, wherein said ring and said holder have cooperating threads for relative axial adjustment thereof.

11. The copier of claim 10, wherein said holder is provided with an internal thread, and said one lens has an external thread which meshes with said internal thread.

12. The copier of claim 11, wherein said unit comprises another lens which is removably mounted in said holder, said other lens having an exterior thread, and said holder being provided with an interior thread which meshes with said exterior thread.

13. The copier of claim 12, wherein said locking element comprises a screw extending transversely of said holder.

14. The copier of claim 1, wherein said unit comprises another lens mounted in said holder, and a sleeve in said holder for positioning said lenses at a predetermined distance from one another.

15. The copier of claim 1, wherein said focusing system further comprises connecting means on said carrier for releasably connecting said adjusting device with said carrier.

16. A copier, particularly a photographic copier, comprising a first support defining a first support plane for originals to be copied; a second support defining a second support plane for copying material; and a focusing system of variable focal length between said supports, said focusing system being designed to form sharp images of originals in said first plane on copying material in said second plane at different magnifications, and said focusing system including a carrier, and an objective unit, said unit comprising a tubular holder removably mounted on said carrier, and at least one lens removably mounted in said holder, and said unit further comprising another lens mounted in said holder, and a sleeve in said holder for positioning said lenses at a predetermined distance from one another, said sleeve and said holder being relatively adjustable axially of said holder.

17. The copier of claim 16, wherein said focusing system comprises an adjusting device for fixing said holder in different positions on said carrier to thereby achieve different magnifications.

18. The copier of claim 16, wherein said sleeve and said holder are provided with cooperating threads for relative axial adjustment thereof.

* * * * *